(12) United States Patent
Li et al.

(10) Patent No.: US 11,168,623 B2
(45) Date of Patent: Nov. 9, 2021

(54) NONLINEAR DISTURBANCE REJECTION CONTROL APPARATUS AND METHOD FOR ELECTRONIC THROTTLE CONTROL SYSTEMS

(71) Applicant: SOUTHEAST UNIVERSITY, Nanjing (CN)

(72) Inventors: Shihua Li, Nanjing (CN); Chen Dai, Nanjing (CN); Jun Yang, Nanjing (CN); Hao Sun, Nanjing (CN); Xiangyu Wang, Nanjing (CN); Qi Li, Nanjing (CN)

(73) Assignee: SOUTHEAST UNIVERSITY, Nanjing (CN)

( * ) Notice: Subject to any disclaimer, the term of this patent is extended or adjusted under 35 U.S.C. 154(b) by 130 days.

(21) Appl. No.: 16/618,380

(22) PCT Filed: Nov. 20, 2018

(86) PCT No.: PCT/CN2018/116293
§ 371 (c)(1),
(2) Date: Dec. 1, 2019

(87) PCT Pub. No.: WO2020/062499
PCT Pub. Date: Apr. 2, 2020

(65) Prior Publication Data
US 2021/0207546 A1    Jul. 8, 2021

(30) Foreign Application Priority Data

Sep. 28, 2018 (CN) .......................... 201811143563.0

(51) Int. Cl.
*F02D 41/00* (2006.01)
*F02D 9/10* (2006.01)
*G05B 13/04* (2006.01)

(52) U.S. Cl.
CPC ....... *F02D 41/0002* (2013.01); *F02D 9/1065* (2013.01); *G05B 13/045* (2013.01); *G05B 13/047* (2013.01); *F02D 2200/602* (2013.01)

(58) Field of Classification Search
CPC .............. F02D 41/0002; F02D 9/1065; F02D 2200/602; G05B 13/047; G05B 13/045
See application file for complete search history.

(56) References Cited

U.S. PATENT DOCUMENTS 5,429,087 A * 7/1995 Tsujino ..................... F02D 9/02
123/336
5,642,712 A * 7/1997 Biondo ................... F02D 11/10
123/394

(Continued)

FOREIGN PATENT DOCUMENTS

CN       104018944 A    9/2014
CN       104696080 A    6/2015

(Continued)

OTHER PUBLICATIONS

X. Jiao, J. Zhang and T. Shen, "An Adaptive Servo Control Strategy for Automotive Electronic Throttle and Experimental Validation," in IEEE Transactions on Industrial Electronics, vol. 61, No. 11, pp. 6275-6284, Nov. 2014, doi: 10.1109/TIE.2014.2311398. (Year: 2014).*

(Continued)

*Primary Examiner* — Phutthiwat Wongwian
*Assistant Examiner* — Sherman D Manley
(74) *Attorney, Agent, or Firm* — Bayramoglu Law Offices LLC

(57) ABSTRACT

A nonlinear disturbance rejection control apparatus and method for electronic throttle control systems are invented to control the electronic throttle system and to achieve a continuous finite-time disturbance rejection control goal. A control sub-apparatus and method are proposed with an (Continued)

observing sub-apparatus and method for controlling the opening angle of an electronic throttle valve. A mathematical model of the electronic throttle system is analyzed and a control-oriented model is presented with the formation of a lumped disturbance. With combination of the continuous terminal sliding mode control method and the output feedback control method, based on the finite-time high-order sliding mode observer, the preferred control performance is guaranteed, where both the dynamic and static performance of the system is effectively improved.

14 Claims, 3 Drawing Sheets

(56) References Cited

U.S. PATENT DOCUMENTS

| | | | | |
|---|---|---|---|---|
| 5,976,054 | A * | 11/1999 | Yasuoka | F16H 61/66 477/48 |
| 6,067,958 | A * | 5/2000 | Kamimura | F02D 9/1065 123/337 |
| 8,907,636 | B2 * | 12/2014 | Li | H02P 9/04 322/29 |
| 9,957,028 | B1 * | 5/2018 | O'Brien | B63H 21/21 |
| 10,054,062 | B1 * | 8/2018 | Andrasko | F02D 9/02 |
| 10,642,262 | B2 * | 5/2020 | Shahroudi | G05B 23/0254 |
| 2003/0120360 | A1 * | 6/2003 | Yasui | G05B 13/042 700/29 |
| 2003/0229408 | A1 * | 12/2003 | Yasui | G05B 13/042 700/30 |
| 2004/0006420 | A1 * | 1/2004 | Yasui | G05B 13/047 701/110 |
| 2004/0049296 | A1 * | 3/2004 | Hashimoto | G05B 13/047 700/28 |
| 2008/0242500 | A1 * | 10/2008 | Asaoka | F16H 61/66259 477/44 |
| 2020/0072151 | A1 * | 3/2020 | Sata | F02D 41/009 |

FOREIGN PATENT DOCUMENTS

| | | |
|---|---|---|
| CN | 106988896 A | 7/2017 |
| EP | 3135885 A1 | 3/2017 |
| JP | 2004176631 A | 6/2004 |

OTHER PUBLICATIONS

Hai Wang, et al., Continuous Fast Nonsingular Terminal Sliding Mode Control of Automotive Electronic Throttle Systems Using Finite-time Exact Observer, IEEE Transactions on Industrial Electronics, Jan. 23, 2018, pp. 7160-7170.

Yonggang Huang, et al., Application of Terminal Sliding Mode Control in Electronic Trottie Valve Sysyem, Chinese Control and Decision Conference (CCDC), Sep. 1, 2017, pp. 5111-5115.

* cited by examiner

NONLINEAR DISTURBANCE REJECTION CONTROL APPARATUS AND METHOD FOR ELECTRONIC THROTTLE CONTROL SYSTEMS

CROSS REFERENCE TO THE RELATED APPLICATION

This application is the national phase entry of International Application No. PCT/CN2018/116293 filed on Nov. 20, 2018, which is based upon and claims priority to Chinese Patent Application No. 201811143563.0, filed on Sep. 28, 2018, the entire contents of which are incorporated herein by reference.

TECHNICAL FIELD

The present disclosure generally relates to the technical field of vehicle engine control systems and methods, and more particularly, relates to electronic throttle control systems and methods.

BACKGROUND

In order to generally present the context of the disclosure, descriptions of the related art and the background are provided herein.

Recent years, with the increasing aggravation of energy crisis, a variety of energy consumption technologies have attracted more attention in the area of vehicle engine control systems. As an alternative of traditional throttles, electronic throttles are extensively applied due to their higher engine efficiency and fuel economy, better automobile drivability, as well as lower gas emission. Hence, electronic throttle systems have become the focus of automotive engineers and researchers.

In the traditional throttle system, the throttle valve is directly connected to an accelerator pedal by wires, the opening degree of which is only related to the pressing-down angle of the pedal. In this way, the control of the opening degree of the throttle valve is relatively simple due to the pure mechanical structure of the traditional throttle. Compared with the traditional one, the control of the opening degree of the electronic throttle valve is implemented in an indirect way, which is adjusted and determined by transmitting the pedal position signal to an electronic control unit (ECU).

Based on the above features, the electronic throttle is usually used to control a fluid flow, more specifically, to simultaneously regulate the engine charge air and fuel in order to obtain an appropriate air-fuel mixture ratio under different working conditions. The control mode of the electronic throttle can take into account more factors, including engine operation conditions, engine speed, torque and even environmental factors by parameter calibration in software. Thus, it is recognized as the throat of the vehicle engine control systems.

As shown in FIGS. 1 and 2, an electronic throttle system 100 consists of the following parts: an accelerator pedal 101, an electronic control unit (ECU) 102, a DC motor 103, an electronic throttle valve 104, a reduction gear set (RGS) 105 (including a motor pinion gear 105a, an intermediate gear 105b and a sector gear 105c), a pair of nonlinear return springs 106a, 106b, a pedal position sensor 107, a throttle angle sensor 108, a DC voltage source 109 and a chopper 110.

The basic operating principle of the electronic throttle system 100 is different from that of the traditional one, which can be illustrated as follows. When a driver steps on the accelerator pedal 101, the pedal's movement can be detected by the pedal position sensor 107, which determines a desired command of the air-fuel mixture ratio for the whole vehicle engine system. The measured value of the pedal position sensor 107 is delivered to the ECU 102 and converted to the desired opening angle of the electronic throttle valve 104 by the ECU 102. At the same time, a control voltage is provided and adjusted by the ECU 102 using a pulse width modulated (PWM) method, which powers the DC motor 103 and generates a rotational torque. The control of the opening degree of the electronic throttle valve 104 is implemented by the rotation of the DC motor 103, which is connected to the output shaft of the electronic throttle valve 104 via the RGS 105. The rotational torque can be transmitted from the DC motor shaft 209 to the throttle plate shaft 215 by the RGS 105. Thus, the actual opening angle of the electronic throttle valve 104 is obtained by the throttle angle sensor 108, and maintained through the RGS 105 in order to meet the desired command. The motion of the electronic throttle valve 104 is constrained by the pair of return springs 106a, 106b between the RGS 105, which can make the electronic throttle valve 104 return to its default position (limp-home position) and remain stationary in the case of power supply failure and zero control input.

In engineering practice, electronic throttle systems are required to reduce the emission and applicable to various operation conditions. Meanwhile, the controlled system ought to satisfy the following pre-determined requirements: a fast transient response without overshoot, a high static position precision and a simple implement of the control strategy. Nevertheless, the running environment of the electronic throttle systems is comparatively complicated, comprising shakings of the engine, high environmental temperature, invasions of the exhaust soot carbon and so on. In addition to the interference resulted by the above factors, there exist various sources of disturbances and uncertainties in practical electronic throttle systems. The disturbances usually consist of transmission frictions (rotational static and dynamic frictions), return springs limp-home (LH), gear backlash and the external disturbances introduced by the intake air flow force, production deviations, variations of external conditions and aging. The uncertainties usually comprise parameters uncertainties of the system components, resulting from different running environments, including different elevation heights, weather conditions, humidity and atmospheric pressure changes that may more or less degrade the control performance. Moreover, the above-mentioned factors (e.g. transmission frictions, return springs LH and gear backlash) may bring about non-smooth characteristic nonlinearities, which exert a significant influence on the performance of electronic throttle systems.

To improve the control performance of electronic throttle systems, there appear various control methods, including proportional-integral-derivative (PID) control, fuzzy control, neural-network-based control, adaptive control, sliding mode control (SMC), etc. Among them, the SMC-based methods have turned out to be superior both in tracking accuracy and robustness. However, due to the existence of the sign function, the control action is discontinuous, which inevitability brings about many adverse effects, such as chattering phenomena, and directly affects the tracking precision and robustness of electronic throttle systems. In addition, the existing solutions are usually designed in the form of state feedback, which requires full information of system states. And the majority of them can only guarantee an asymptotic convergence rather than a finite-time one.

Therefore, it is crucial in this disclosure to develop an advanced and practical control strategy for meeting all the above-specified requirements and improving both the convergence speed and the disturbance rejection performance of electronic throttle systems.

SUMMARY

In this invention, a set of apparatuses and methods is invented for controlling the electronic throttle system 100 and achieving a continuous finite-time disturbance rejection control goal. The proposed control sub-apparatus and method are both disclosed, further combined with an observing sub-apparatus and method to acquire the estimation value of system states and the lumped disturbance, and to control the opening angle of the electronic throttle valve 104.

In one embodiment, a mathematical model of the electronic throttle system 100 is analyzed and a control-oriented model is presented in detail, and the concept of the lumped disturbance is introduced and formed.

In one embodiment, an observing sub-apparatus using a finite-time high-order sliding mode method is designed to estimate the value of system states and the lumped disturbance.

In one embodiment, a control sub-apparatus using the continuous terminal sliding mode control method is developed to guarantee a continuous control motion and a finite-time convergence, where both the dynamic and static performance of the electronic throttle system 100 is further improved.

BRIEF DESCRIPTION OF THE DRAWINGS

The above and other objects, features and advantages of the embodiments of the present invention will be more readily apparent by means of the following detailed description with reference to the accompanying drawings, in which.

In the figures, several embodiments of the present invention are illustrated in an exemplary but non-restrictive manner. Besides, identical or corresponding reference numbers in the figures designate identical or corresponding portions.

DETAILED DESCRIPTION OF THE EMBODIMENTS

In this part, the principles and spirit of the present invention will be depicted in detail through several exemplary embodiments with reference to the corresponding drawings. It should be understood that the embodiments provided are simply aimed to facilitate those skilled in the art to better understand and further implement the present invention. Therefore, it is not limited to consider specific dimensions and other physical characteristics related to the embodiments disclosed herein.

Particularly, it should be mentioned that the term 'parameter(s)' is used for indicating the value of physical states or the physical quantity of operation conditions of the engine. Besides, in the context of the present specification, define F as a given physical quantity, then $\dot{F}$ denotes a derivative of F with respect to time; $\hat{F}$ denotes an estimation value of the physical quantity F; $F=F(x)$ denotes that the parameter F is a function of x, and $F=F(x_1,x_2)$ denotes that the parameter F is a function of $x_1$ and $x_2$. Moreover, the term 'acquire' and its derivatives are used for indicating several effective devices/means, including measuring, transmitting, collecting, predicting, observing, etc.; the term 'measure' and its derivatives are used for indicating several effective devices/means, including directly measuring, sensing, reading, computing, predicting, observing, etc.

Figure 1:
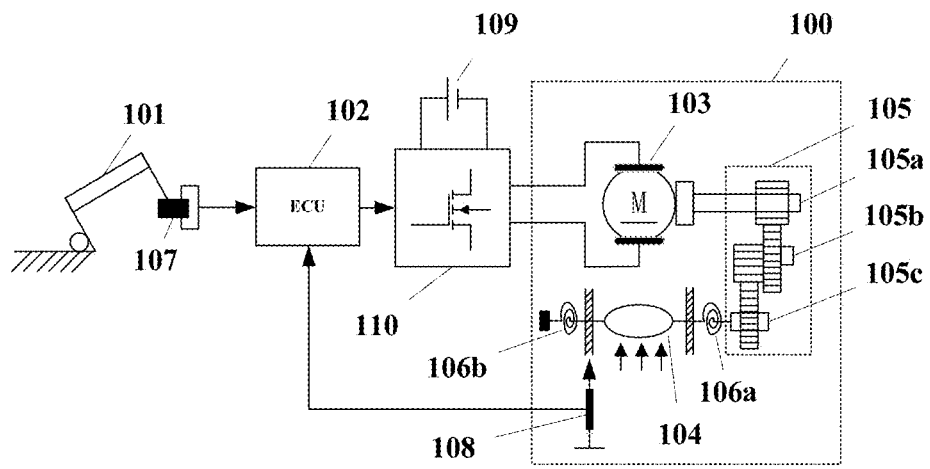
FIG. 1 illustrates a schematic view of an electronic throttle system.
Figure 2:
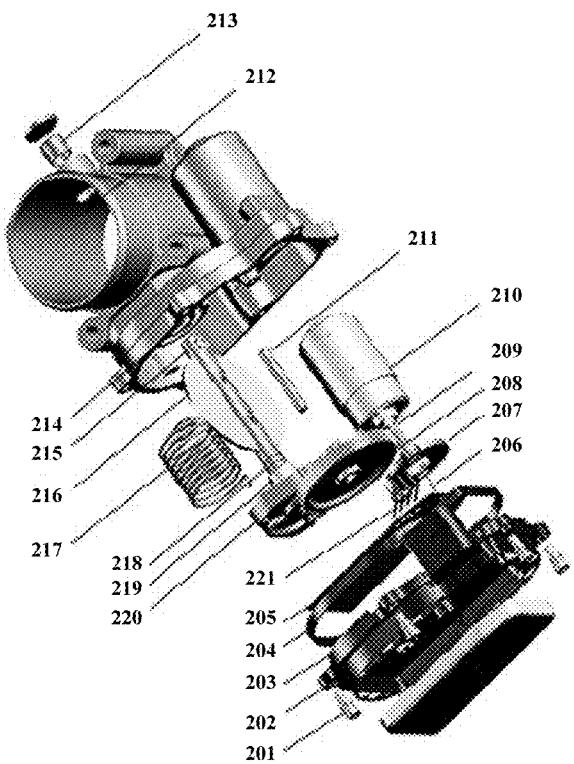
FIG. 2 illustrates a stereogram of an electronic throttle.

Hereinafter, a schematic view of an electronic throttle system 100 is firstly depicted in detail with reference to FIG. 1. It should be noted that FIG. 1 illustrates only the parts associated with the present invention in the electronic throttle system 100 of a vehicle engine. The practical electronic throttle systems may comprise other components as well.

As shown in FIG. 1, the electronic throttle system 100 comprises: an accelerator pedal 101; a pedal position sensor 107 configured to acquire the real-time tread of a driver, namely, the pedal movement; an electronic throttle valve 104 configured to regulate the quantity of air flowing into the electronic throttle system 100 in accordance with the real-time pedal movement; a throttle angle sensor 108 configured to acquire the actual opening angle of the electrical throttle; a reduction gear set (RGS) 105 (comprising a motor pinion gear 105a, an intermediate gear 105b and a sector gear 105c), configured to serve as a path to transmit rotations; a DC motor 103, configured to provide a rotational torque via the RGS 105 for controlling the opening angle of the electronic throttle valve 104; an electronic control unit (ECU) 102, configured to provide control signals based on various operation condition parameters of the electronic throttle system 100; a pair of nonlinear return springs 106a, 106b mounted on the RGS 105, configured to constrain the motion of the electronic throttle valve 104, and thereby make the electronic throttle valve 104 back to its default position (the so-called LH position), and remain stationary in the case of power supply failure and zero control input.

The basic operating principle of the electronic throttle system 100 can be illustrated by the following. When the driver is stepping down on the accelerator pedal 101, the actual opening angle of the electronic throttle valve 104 is acquired by the throttle angle sensor 108 and transferred to the ECU 102 for the subsequent control purpose. Meanwhile, the desired opening angle of the electronic throttle valve 104 is computed by the ECU 102 in order to determine the appropriate air-fuel mixture ratio for the whole engine system. The ECU 102 adjusts the driving voltage using a pulse width modulated (PWM) method, so as to power the embedded DC motor 103 and generate the rotational torque. Then, the rotational torque can be transmitted from the shaft of the DC motor 103 to that of the electronic throttle valve 104 via the RGS 105, so as to make the actual opening angle of the electronic throttle valve 104 track the desired value.

In order to obtain the desired opening angle of the electronic throttle valve 104 and achieve a finite-time convergence with strong robustness simultaneously, a technical solution is proposed in this invention. A set of apparatuses and methods are invented to control and observe the electronic throttle system 100, where the apparatus consists of a control sub-apparatus and an observing sub-apparatus. Hereinafter, detailed depictions will be provided by the present invention with reference to the exemplary embodiments, such that those skilled in the art can easily understand and implement the present invention based on the disclosure.

Figure 3:
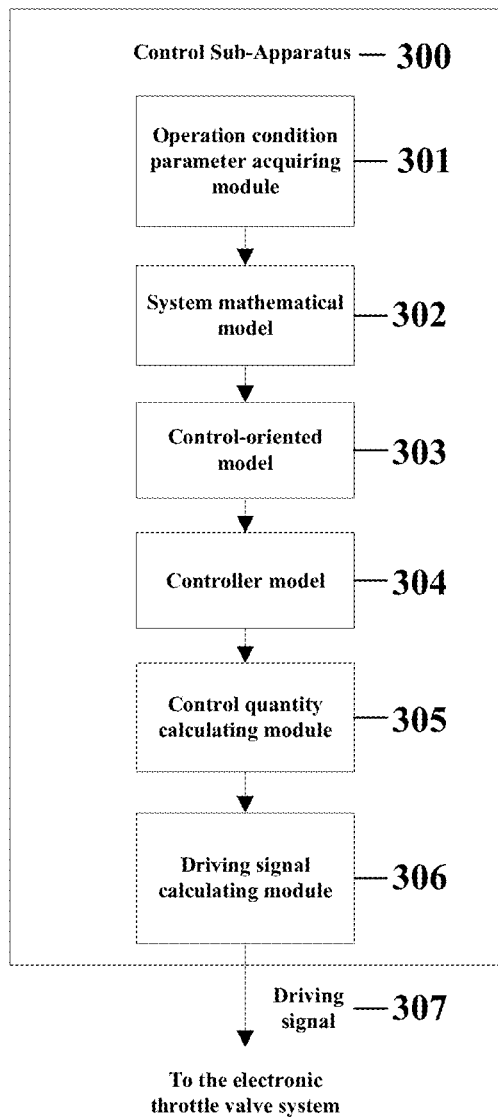
FIG. 3 illustrates a schematic flow chart of a sub-apparatus for controlling the opening angle of an electronic throttle valve according to an embodiment of the present invention.

Referring to FIG. 3, a control sub-apparatus 300 for the electronic throttle system 100 is provided in the present invention and an exemplary block diagram of the control sub-apparatus 300 is schematically illustrated in detail. It should be mentioned that the control sub-apparatus 300 is not limited to be specifically implemented as the ECU 102 of FIG. 1, and it can also be implemented as a separate control device.

As shown in FIG. 3, the control sub-apparatus 300 comprises: an operation condition parameter acquiring module 301, configured to acquire operation conditions associated with the electronic throttle system 100, including the actual opening angle of the electronic throttle valve 104; a system mathematical model 302, configured to characterize the electronic throttle system 100, based on the analysis of the operating principle of the electronic throttle system 100; a control-oriented model 303, configured to employ mathematical methods to facilitate the subsequent designing process of the controller model 304; a controller model 304 designed based on a desired value of the system output determined by the ECU 102 and the control-oriented model 303; a control quantity calculating module 305, coupled to the operation condition parameter acquiring module 301 and configured to provide an appropriate control quantity for the electronic throttle system 100; and a driving signal calculating module 306, coupled to the control quantity calculating module 305 and configured to generate the driving signals based on the control quantity determined by the control quantity calculating module 305.

According to some other embodiments of the present invention, the operation condition parameters may comprise the actual opening angle of the electronic throttle valve 104, the internal fuel efficiency of the engine, the external loads, weather conditions and other environmental factors that may change timely and/or uncertainly. It should be appreciated that the above operation conditions are only examples associated with the electronic throttle system 100, which may be used in combination or may include any other unmentioned operation conditions. The present invention is not limited in these aspects.

Hereinafter, an exemplary embodiment will be depicted with reference to the accompanying drawings to illustrate the process of building a mathematical model and a control-oriented model of the electronic throttle system 100. It should be mentioned that the way of building the mathematical model and the control-oriented model is not limited in the exemplary embodiments herein, and other appropriate methods may work as well.

In this exemplary embodiment, the mathematical model of the electronic throttle system 100 consists of a mathematical model of the DC motor 103 and a mathematical model of the electronic throttle valve 104.

The mathematical model of the DC motor 103 can be characterized as follows: an expression for the shaft angle of the DC motor 103; an expression for the angular velocity of the DC motor 103; an expression for the total resistance of the armature circuit; and expressions for the armature current and voltage of the armature inductance, respectively.

The mathematical model of the electronic throttle valve 104 can be characterized as follows: an expression for the opening angle of the electronic throttle valve 104; an expression for the angular velocity of the electronic throttle valve 104; expressions for the input and output torques of the RGS 105; an expression for the load disturbance torque from the intake air flow force applying on the electronic throttle valve 104; an expression for the torque of the nonlinear return springs 106a, 106b; and an expression for the friction torque.

Mathematical Model of the Electronic Throttle System

While designing a mathematical model of the electronic throttle system 100 by leveraging the given mechanism and theory, the following hypotheses are made first: (1) the value of the armature inductance is small enough that the dynamic of the armature current can be ignored; (2) the torque coefficient and component parameters of the DC motor 103 do not vary or vary very slowly with temperature and pressure; (3) only the simplest coulomb friction model is considered in the friction analysis, and the influence of other more complex friction characteristics on the system is ignored; and (4) the first order derivative of external disturbance and the second order derivative of the reference signal are both bounded with some known positive constants.

Given the above hypotheses, the following equations may be derived.

1. Electric Equations of the DC Motor

According to the circuit theory based on the Kirchhoff's laws, the electric equations of the DC motor 103 are firstly analyzed and presented as follows:

$$\omega_m = \dot{\theta}_m, L\dot{i} + Ri = u - k_e\omega_m, \qquad \text{(Equation 1)}$$

wherein, $\theta_m$ is the shaft angle of the DC motor 103 (rad); $\omega_m$ is the angular velocity of the DC motor 103 (rad/s); R is the total resistance of the armature circuit (Ω, constant); L is the armature inductance (H, constant); i is the armature current (A); u is the PWM equivalent voltage (V); and $k_e$ is the electromotive coefficient (V/rad/s, constant).

By means of the decomposition of the PWM voltage signal, the DC component can be regarded as the equivalent armature voltage of the DC motor 103, which is expressed as $$u = T^{-1}\tau U_{max}, \qquad \text{(Equation 2)}$$

wherein, T is the period of the signal (s, constant); τ is the high level time in single cycle (s); and $U_{max}$ is the amplitude of the high level voltage (V).

2. Mechanical Equation of the DC Motor

Based on the moment balance principle, the mechanical equation of the DC motor 103 may be derived:

$$J_m\dot{\omega}_m = T_a - B_m\omega_m - T_m, \qquad \text{(Equation 3)}$$

wherein, $T_a = k_m i$ is the rotational torque of the DC motor 103 (N·m); $k_m$ is the coefficient of the rotational torque of the DC motor 103 (N·m/A, constant); $T_m$ is the input toque of the RGS 105 (N·m); $J_m$ is the moment of inertia of the DC motor 103 (kg·m'''); and $B_m$ is the viscous damping coefficients of the DC motor 103 (N·m·s/rad).

In this exemplary embodiment, considering the fact that the value of the armature inductance is relatively small, the dynamic of the armature current can be neglected. Therefore, combined with Equations 1 to 3, the mechanical equation of the DC motor 103 can be simplified as:

$$J_m\dot{\omega}_m = k_m R^{-1}(u - k_e\omega_m) - B_m\omega_m - T_m. \qquad \text{(Equation 4)}$$

3. Mechanical Equations of the Electronic Throttle Valve

According to the operation principle of the electronic throttle valve 104, the mechanical equations of it may be derived as follows:

$$\omega_t = \dot{\theta}_t, J_t\dot{\omega}_t = T_o - B_t\omega_t - T_f - T_{sp} - T_L, \quad \text{(Equation 5)}$$

wherein, $\theta_t$ is the actual opening angle of the electronic throttle valve 104 (rad); $\omega_t$ is the angular velocity of the electronic throttle valve 104 (rad/s); $J_t$ is the moment of inertia of the electronic throttle valve 104 (kg·M$^2$); $B_t$ is the viscous damping coefficient of the electronic throttle valve 104 (N·m·s/rad); $T_o$ is the output torque of the RGS 105 (N·m); and $T_L$ is the load disturbance torque resulting from the intake air flow force applying on the electronic throttle valve 104 (N·m).

In Equation 5, $T_{sp}$ is the torque of the nonlinear return springs 106a, 106b (N·m), and $T_f$ is the friction torque (N·m), which can be modeled as:

$$T_{sp} = K_{sp}(\theta_t - \theta_0) + T_{LH}\text{sign}(\theta_t - \theta_0), T_f = F_S(\omega_t)\text{sign}(\omega_t), \quad \text{(Equation 6)}$$

wherein, $K_{sp}$ is the stiffness coefficient of the nonlinear return springs 106a, 106b (N·m/rad); $T_{LH}$ is the initial torque of the nonlinear return springs 106a, 106b (N·m); $F_S(\omega_t)$ is the nonlinear friction function with respect to the angular velocity $\omega_t$; and sign(•) represents the standard sign function.

4. Equation of the Backlash Nonlinearity

Since the gear backlash would bring about non-smooth characteristic nonlinearities and exert a significant influence on the performance of the electronic throttle system 100, the backlash nonlinearity can be derived for the control purpose:

$$T_o = NT_m + d(T_m), \quad \text{(Equation 7)}$$

wherein, N is the gear ratio (constant), satisfying $\theta_m/\theta_t = \dot{\theta}_m/\dot{\theta}_t = \omega_m/\omega_t = N$; and $d(T_m)$ is a bounded nonlinear function of the input torque $T_m$ of the RGS 105.

5. Mathematical Model of the Electronic Throttle System

Based on the above equations, the following mathematical model of the electronic throttle system 100 is obtained by eliminating $\theta_m$ and $\omega_m$ as:

$$J\dot{\omega}_t + B\omega_t + T_g + T_D = \rho u, \quad \text{(Equation 8)}$$

with $$J = N^2 J_m + J_t, B = N^2 B_m + B_t + R^{-1}k_tk_eN^2,$$

$$T_g = T_f + T_{sp} = F_S\text{sign}(\omega_t) + K_{sp}(\theta_t - \theta_0) + T_{LH}\text{sign}(\theta_t - \theta_0),$$

$$T_D = d(T_n) - T_L, \rho = R^{-1}NK_t \quad \text{(Equation 9)}$$

wherein, J is the equivalent inertia of the electronic throttle valve 104 (kg·m$^2$); B is the equivalent viscous damping coefficient of the electronic throttle valve 104 (N·m·s/rad); $T_D$ is the generalized bounded disturbance torque (N·m); and $T_g$ is the sum of $T_{sp}$ and $T_f$ (N·m).

In this exemplary embodiment, given the impacts of the parametric variations, the bounded parameter uncertainties $\Delta J$, $\Delta B$, $\Delta F_S$, $\Delta T_{LH}$, $\Delta K_{sp}$, $\Delta T_g$, $\Delta\rho$ are formulated as:

$$|\Delta J| = |J - J_0| \leq \overline{\Delta J}, |\Delta B| = |B - B_0| \leq \overline{\Delta B}, |\Delta_{FS}| = |F_S - F_{S0}| \leq \overline{\Delta F_S},$$

$$|\Delta T_{LH}| = |T_{LH} - T_{LH0}| \leq \overline{\Delta T_{LH}}, |\Delta K_{sp}| = |K_{sp} - K_{sp0}| \leq \overline{\Delta K_{sp}},$$

$$|\Delta T_g| \leq \overline{\Delta F_S} + \overline{\Delta T_{LH}} + \overline{\Delta K_{sp}} = \overline{\Delta T_g}, |\Delta\rho| = |\Sigma - \rho_0| \leq \overline{\Delta\rho}, |T_D| \leq \overline{\Delta T_D}, \quad \text{(Equation 10)}$$

wherein, $J_0$, $B_0$, $F_{S0}$, $T_{LH0}$, $K_{sp0}$ and $\rho_0$ represent the nominal parameters of the electronic throttle system 100, respectively; and $\overline{\Delta J}$, $\overline{\Delta B}$, $\overline{\Delta F_S}$, $\overline{\Delta T_{LH}}$, $\overline{\Delta K_{sp}}$, $\overline{\Delta T_g}$, $\overline{\Delta\rho}$ and $\overline{\Delta T_D}$ are the upper bounds of the parameters uncertainties, respectively.

Hence, the mathematical model of the electronic throttle system 100 can be rewritten as:

$$J_0\dot{\omega}_t + B_0\omega_t + T_{g0} = \rho_0 u + d, \quad \text{(Equation 11)}$$

wherein d is the lumped disturbance of the electronic throttle system 100, given by $d = -J_0^{-1}(\Delta J\dot{\omega}_t + \Delta B\omega_t + \Delta T_g - \Delta\rho u - T_D)$.

In this exemplary embodiment, the lumped disturbance of the electronic throttle system 100 consists of complex parameter uncertainties, unknown nonlinearities and external disturbances from different sources (e.g. the DC motor 103 and the electronic throttle valve 104). The parameter uncertainties mainly result from the moments of inertia and the damping coefficients of the DC motor 103, the electronic throttle valve 104, and the modelling errors of the friction torque and the torque of the return springs 106a, 106b. The unknown nonlinearities comprise the transmission friction torque $T_f$, the gear backlash $d(T_m)$, and the nonlinear return springs torque $T_{sp}$. The external disturbances consist of the variation of the torque load $T_L$ caused by the quantity change of the intake air flowing into the electronic throttle system 100, the fluttering of the engine, the parameter variations due to the environmental condition change, etc.

6. Control-Oriented Model of the Electronic Throttle System

Hereinafter, the control-oriented model of the electronic throttle system 100 is built according to the above modeling and analysis. In this embodiment, $\theta_{ref}$ denotes the desired value of the opening angle of the electronic throttle valve 104 (rad). Then, the tracking error between the actual opening angle $\theta_t$ and the reference opening angle $\theta_{ref}$ of the electronic throttle valve 104 is defined as a state variable of the electronic throttle system 100, which can be expressed as: $x_1 = \theta_t - \theta_{ref}$.

By taking the derivative of $x_1$, another state variable is defined and the following equation may be derived: $x_2 = \dot{x}_1 = \dot{e} = \dot{\theta}_t - \dot{\theta}_{ref}$. As depicted in the aforementioned equations, the derivative of $x_2$ is expressed as:

$$\dot{x}_2 = -J_0^{-1}[B_0(x_2 + \dot{\theta}_{ref}) + T_{g0} + \rho_0 u] + d - \ddot{\theta}_{ref}. \quad \text{(Equation 12)}$$

By means of further arrangement, the control-oriented model of the electronic throttle system 100 can be expressed as follows:

$$\begin{cases} \dot{x}_1 = x_2, \\ \dot{x}_2 = f(x_2) + gu + d, \\ y = x_1, \end{cases} \quad \text{(Equation 13)}$$

wherein, $f(x_2) = -J_0^{-1}[B_0(x_2 + \dot{\theta}_{ref}) + T_{g0}] - \ddot{\theta}_{ref}$, $$g = \frac{\rho_0}{J_0}.$$

It should be appreciated that there may exist diverse variations of the above control-oriented model. For instance, one or more of the above-mentioned uncertainties or nonlinearities may not be considered in the model under some circumstances, and/or other sources of uncertainties/nonlinearities may be added. On the basis of the above suggestions presented by the present invention, it is possible for those skilled in the art to design and implement any appropriate control-oriented models of electronic throttle systems combining with specific control demands and operation conditions.

Design of the Observer Model

Given that the boundary information of the above-mentioned lumped disturbance is unknown and certain system states are difficult to obtain in real applications, the control gain would thereby be comparatively conservative, which may give rise to severe chattering phenomena and potential control saturation consequently. Besides, estimation characteristics of the observer may have effects on the performance of the system as well.

Figure 4:
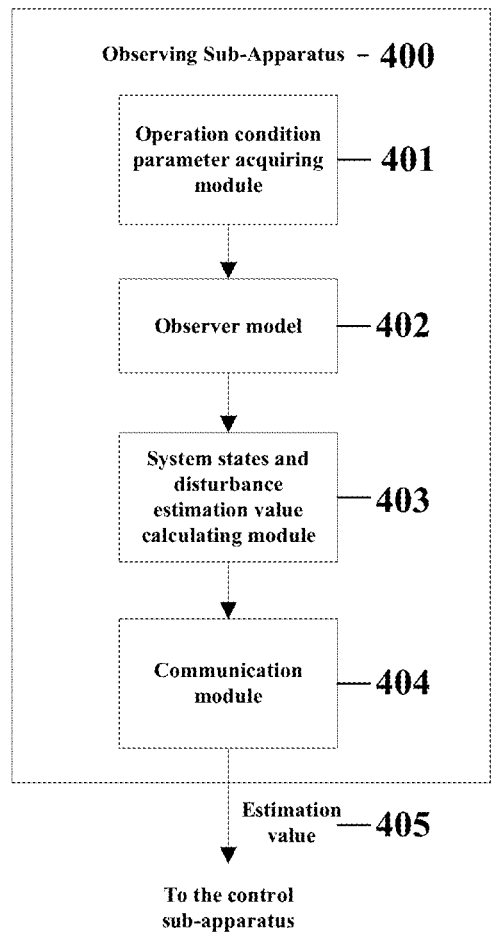
FIG. 4 illustrates a schematic flow chart of a sub-apparatus for observing system states and disturbances of an electronic throttle system according to an embodiment of the present invention.

As shown in FIG. 4, the observing sub-apparatus 400 comprises: an operation condition parameter acquiring module 401, configured to acquire operation conditions associated with the electronic throttle system 100; an observer model 402 designed based on the control-oriented model 303 of the control sub-apparatus 400, configured to observe the system states and the lumped disturbance, and further acquire the control quantity determined by the control quantity calculating module 304; a system states and disturbance estimation value calculating module 403, coupled to the operation condition parameter acquiring module 401 and the control quantity calculating module 304, and configured to determine estimation values based on the observer model 402; and a communication module 404 configured to transmit the information between the control sub-apparatus 300 and the observing sub-apparatus 400, including the operation condition parameters, the control quantity and the estimation values.

For a purpose of illustration, an instance of designing a state and disturbance observer model will be provided. However, it should be mentioned that, as known to those skilled in the art, various approaches may be adopted to design the observer model 402.

Hereinafter, a finite-time observer using high-order sliding mode theory is designed as an exemplary embodiment, based on the control-oriented model Equation 13 and depicted with reference to embodiments. The observer is aimed to acquire the estimation value of system states and the lumped disturbance of the electronic throttle system 100 in finite time without losing stability of the closed-loop system. However, it should be mentioned that the observer in the present invention is not limited thereto, and those skilled in the art may make several modifications and transformations.

In order to estimate the value of the system states and the lumped disturbance of the electronic throttle system 100, the observer will be designed based on the control-oriented model Equation 13 and the operation condition parameters. The operation condition parameters comprise: the desired value of the opening angle of the electronic throttle valve 104; the nominal value of the inertia of the electronic throttle valve 104; the viscous damping coefficient of the electronic throttle valve 104; the torque of the nonlinear return springs 106a, 106b; and the friction torque.

In this exemplary embodiment, the finite-time observer is designed as:

$$\begin{cases} \dot{z}_1 = v_1, \; v_1 = -\lambda_1 K^{\frac{1}{3}} |z_1 - x_1|^{\frac{2}{3}} \text{sign}(z_1 - x_1) + z_2, \\ \dot{z}_2 = v_2 + gu + f(z_2), \; v_2 = -\lambda_2 K^{\frac{1}{2}} |z_2 - v_1|^{\frac{1}{2}} \text{sign}(z_2 - v_1) + z_3, \\ \dot{z}_3 = v_3, \; v_3 = -\lambda_3 K \text{sign}(z_3 - v_2), \end{cases} \quad \text{(Equation 14)}$$

wherein, $f(z_2) = -J_0^{-1}[B_0(z_2 + \dot{\theta}_{ref} + T_{g0}] - \ddot{\theta}_{ref}$; K is the boundary constant of the first order derivative of the lumped disturbance; $\lambda_i > 0$ (i=1, 2, 3) are the coefficients to be designed; and $z_1$, $z_2$ and $z_3$ are the estimation values of the system output $x_1$, the unknown state $x_2$, and the lumped disturbance d, respectively.

In combination with Equations 13 and 14, the estimation errors of the observer model are defined as: $e_1 = \hat{x}_1 - z_1$, $e_2 = \hat{x}_2 - z_2$, $e_3 = \hat{d} - z_3$, which are governed by $$\begin{aligned} \dot{e}_1 &= -\lambda_1 |e_1|^{\frac{2}{3}} \text{sign}(e_1) + e_2, \\ \dot{e}_2 &= -\lambda_2 |e_2 - \dot{e}_1|^{\frac{1}{2}} \text{sign}(e_2 - \dot{e}_1) + e_3, \\ \dot{e}_3 &\in -\lambda_3 \text{sign}(e_3 - \dot{e}_2) + [-K, K]. \end{aligned} \quad \text{(Equation 15)}$$

It can be demonstrated that there exists a time constant $t_f$ such that $e_i = 0$ (i=1, 2, 3) when $t \geq t_f$. Thus, in this exemplary embodiment, the error system Equation 15 of the observer model can be proved to be finite-time stable.

In this exemplary embodiment, the observer model Equation 14 may determine the estimation value of system states and the lumped disturbance, so as to calculate the subsequent control quantity. It is of great significance that by virtue of the observer model Equation 14, the switching gain of the control quantity requires being greater than the boundary of the estimation error of the lumped disturbance, rather than that of the lumped disturbance itself. In this way, the chattering phenomena caused by the high switching gain may be decreased largely.

Although those skilled in the art may appreciate that the above embodiment only illustrates one embodiment to design an observer model, it should be noted that any modifications to the above embodiment, based on the idea of the present invention, should all fall within the protection scope of the present invention.

Design of the Controller Model

Hereinafter, there is provided an exemplary embodiment of designing a controller model based on the control-oriented model Equation 13 of the electronic throttle system 100 and the observer model Equation 14. The designing process will be depicted with reference to the accompanying embodiments. The controller model is utilized to make the opening angle of the electronic throttle valve 104 approach to the desired value under various operation conditions. However, it should be mentioned that the provision of the controller model in this exemplary embodiment is not limited thereto, and those skilled in the art may make several modifications and transformations.

In this exemplary embodiment, a controller model is developed, referring to continuous terminal sliding mode control theory and output feedback control theory, to ensure the continuous control motion, finite-time convergence and disturbance rejection performance of the controlled electronic throttle system 100.

To form the controller model, a terminal sliding-mode manifold is first derived as:

$$s = f(z_2) + b_0 u + z_3 + c_2 \text{sign}(z_2)|z_2|^{\alpha_2} \pm c_1 \text{sign}(x_1)|x_1|^{\alpha_1}, \quad \text{(Equation 16)}$$

wherein, s is the sliding variable, $z_2$, $z_3$ are the estimation values obtained by the observer model Equation 14; $c_1$, $c_2$ are positive constant parameters of the sliding mode manifold to be designed, satisfying that the polynomial $p^2 + c_1 p + c_2$ is Hurwitz, i.e., the eigenvalues of the polynomial are all in the left-half side of the complex plane; and $\alpha_1$, $\alpha_2$ are positive constant parameters of the sliding mode manifold to be designed, which are determined based on the following conditions:

$$\alpha_1 = \frac{\alpha_2}{2-\alpha_2}, \alpha_2 \in (1-\varepsilon, 1),$$

with $\varepsilon \in (0,1)$.

Then, the controller model in this exemplary embodiment is designed as:

$$u = -g^{-1}(u_1 + u_2 + u_3), \quad \text{(Equation 17)}$$

wherein, $u_1 = c_1 \, \text{sign}(x_1)|x_1|^{\alpha_1}$, $u_2 = f(z_2) + z_3 + c_2 \, \text{sign}(z_2)|z_2|^{\alpha_2}$, $\dot{u}_3 = \eta \, \text{sign}(s)$ and $\eta > 0$ is the parameter of the controller to guarantee the finite-time convergence of the sliding variable s.

By means of the proposed controller model, the tracking error $x_1$ of the opening angle of the electronic throttle system 100 converges to the equilibrium point in finite time, i.e., the opening angle $\theta_t$ of the electronic throttle valve 104 tracks the desired value $\theta_{ref}$ in finite time. Thus, the controller model designed in this exemplary embodiment improves both the dynamic and static performance of the electronic throttle system 100.

Moreover, it is noted that the controller model comprises three parts. The first part is an output feedback control term: $u_{fb} = u_1 = c_1 \, \text{sign}(x_1)|x_1|^{\alpha_1}$, wherein, $c_1$ and $\alpha_1$ are control coefficients, and may be determined based on the acquired operation condition parameters and constant parameters associated with the control-oriented model. In practice, it is preferable to use the corresponding filtered value to calculate this control term, which can enhance the accuracy by eliminating the noise existing in the directly measured value.

The second part is a feedforward control term: $u_{ff} = u_2 = f(z_2) + z_3 + c_2 \, \text{sign}(z_2)|z_2|^{\alpha_2}$, wherein, $c_2$, $\alpha_2$ are control coefficients and can be determined based on the acquired operation condition parameters and constant parameters associated with the control-oriented model. And $z_2$, $z_3$ are the estimation values obtained by the observer model Equation 14 in finite time.

The last part thereof is a finite-time control term: $u_{ft} = u_3$, wherein, $\eta > 0$ is the control coefficient as shown in the Equation 17. It should be mentioned that the switching term, i.e. the sign function, is designed to appear in the derivative of this control term, which guarantees both the finite-time convergence of the sliding variable s, and the continuity of the control action.

The above three control terms jointly form the control quantity u, i.e., the equivalent driving voltage of the DC motor 103.

However, the above provided controller model is only an exemplary embodiment of the present invention. As known to those skilled in the art, the present invention is not limited to the exemplary embodiments provided herein. For instance, one or more of parameters or aspects may not be considered in the control-oriented model Equation 13 under some circumstances, and/or new parameters or aspects of the electronic throttle system 100 may be added into the control-oriented model Equation 13. On the basis of the above suggestions and inspiration provided by the present invention, it is possible for those skilled in the art to design and implement any appropriate controller model for the electronic throttle system 100, combining with specific control demands and operation conditions.

In the exemplary embodiment of the present invention, some operation condition parameters need to be acquired by measurement devices like sensors, for example, the actual opening angle of the electronic throttle valve 104. Certain operation condition parameters, such as the torque of the DC motor 103 and the angular velocity of the electronic throttle valve 104, may be derived by calculation based on other measured parameters and the physical interrelations. Additionally, there are some parameters difficult to acquire, such as the torque of the return springs 106a, 106b, and the external disturbances. Hereto, they may be treated as the components of the lumped disturbance and be estimated based on the states of relevant available parameters and by virtue of empirical manners like the aforementioned observer.

Figure 5:
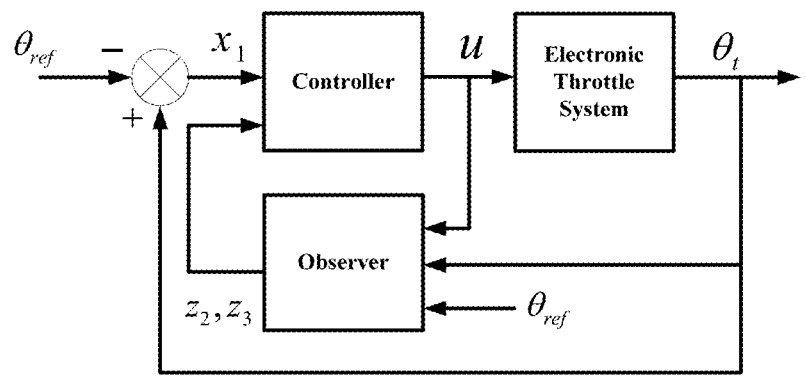
FIG. 5 illustrates a block diagram of controlling an opening angle of an electronic throttle system according to an exemplary embodiment of the present invention.

For the sake of clarity, FIG. 5 illustrates a block diagram of the electronic throttle control system of this exemplary embodiment.

As shown in FIG. 5, the electronic throttle control system consists of an observer model, and a controller model that comprises an output feedback control section, a feedforward control section and a finite-time control section. The tracking error between the actual opening angle and the desired value is provided to the aforementioned output feedback control section, and provides a feedback control term $u_{fb}$ based on the acquired operation condition parameters. The observer model provides the estimation values of system states and the lumped disturbance based on the control quantity u, and the acquired operation condition parameters provided by the control-oriented model, respectively. Thus, the feedforward control section provides a feedforward control term $u_{ff}$ based on the estimation values and the measured operation condition parameters. By means of the finite-time control section and the observer model, the finite-time convergence of the closed-loop system can be achieved. Therefore, the proposed control method of the present invention achieves a finite-time convergence with satisfying disturbance rejection performance, which further improves the dynamic and static performance of the electronic throttle valve system 100.

It should be mentioned that the embodiments of the present invention can be implemented in hardware, software or the combination thereof. Those skilled in the art may understand that the proposed method and system may be implemented with a computer-executable instruction and/or in a processor controlled code. The apparatuses and their components in the present invention may be implemented by hardware circuitry of a programmable hardware device, software executed by various kinds of processors, or the combination thereof.

Although the present invention has been depicted with reference to the exemplary embodiments, it should be understood that the present invention is not limited to the disclosed embodiments. On the contrary, the present invention intends to cover various modifications and equivalent arrangements included in the spirit and scope of the appended claims. The scope of the appended claims accords with the broadest explanations and covers all such modifications and equivalent structures and functions.

What is claimed is:

1. An electronic throttle system, comprising:
    an accelerator pedal operated by a driver; an electronic throttle valve configured to provide an appropriate air-fuel mixture ratio according to a desired pedal command; an electrical control unit (ECU) configured to implement an electrical control algorithm; a DC motor configured to provide an initial rotational torque for the electronic throttle valve; a reduction gear set (RGS) configured to be a transmission gear from the DC motor to the electronic throttle valve; a pair of nonlinear return springs configured to make the electronic throttle valve return to a default position and remain stationary in a safety zone in case of a power failure; a pedal position sensor configured to detect a movement of the accelerator pedal; and a throttle angle sensor configured to detect an actual opening angle of the electronic throttle valve, wherein a basic operating principle of the electronic throttle system is different from a mechanical throttle valve; a control of the actual opening angle of the electronic throttle valve is realized based on a rotation of the DC motor; and an electrical interface is used for controlling of the electronic throttle system; and the electronic throttle valve is a rotating structure, wherein a default opening state of the electronic throttle valve is fully open.

2. The electronic throttle system according to claim 1, wherein the ECU is configured to determine an air-fuel mixture ratio according to a desired command measured by the pedal position sensor; by means of a PWM method, a control voltage is provided and adjusted by the ECU, wherein the control voltage powers the DC motor and generates the initial rotational torque consequently.

3. The electronic throttle system according to claim 1, wherein the DC motor is an actuator of the electronic throttle system and provides the initial rotational torque to deflect the electronic throttle valve; the DC motor is connected to an output shaft of the electronic throttle valve via the RGS and the torque of the DC motor is regulated by the ECU according to the desired command; an armature voltage of the DC motor is a PWM equivalent voltage provided by the ECU.

4. The electronic throttle system according to claim 1, wherein the RGS comprises a motor pinion gear, an intermediate gear, and a sector gear.

5. The electronic throttle system according to claim 1, wherein the pair of nonlinear return springs are not installed naturally stretched, but twisted to a specific position, the actual opening angle of the electronic throttle valve provides initial torque changes.

6. An apparatus for controlling an electronic throttle system of a vehicle engine, comprising: an operation condition parameter acquiring module, configured to acquire operation condition parameters associated with the electronic throttle system; a system mathematical model configured to characterize the electronic throttle system; a control-oriented model configured to facilitate a subsequent control designing; a controller model designed based on the control-oriented model and a desired value of a system output; a control quantity calculating module, coupled to the operation condition parameter acquiring module and configured to determine a control quantity for controlling the electronic throttle system based on the operation condition parameters, the desired value of the system output and a control law designed based on the control-oriented model, wherein the control quantity is a voltage value; a driving signal calculating module coupled to the control quantity calculating module and configured to determine a driving signal for a DC motor based on the determined control quantity; an observer model designed based on the control-oriented model and configured to acquire the estimation values of system states and a lumped disturbance; the system states and disturbance estimation value calculating module, coupled to the operation condition parameter acquiring module and the control quantity calculating module, and configured to determine estimation values based on the observer model; and a communication module configured to transmit information between a control sub-apparatus and an observing sub-apparatus; and the mathematical model comprises expressions for the shaft angle and an angular velocity of the DC motor; expressions for an actual opening angle and an angular velocity of an electronic throttle valve; an expression for a total resistance of an armature circuit expressions for the armature current and voltage of an armature inductance; expressions for an input torque of the RGS and an output torque of the RGS; expressions for a torque of a load disturbance and one of a nonlinear return spring; and an expression for a friction torque, wherein the modelling analysis is based on electrical equations of the DC motor and mechanical equations of the DC motor and the electronic throttle valve, respectively; at an onset of a design, a transformation of coordinates is utilized to transform the mathematical model into an integral form, wherein the integral form gives rise to the control-oriented model; a tracking error between the actual opening angle and the desired value, and a derivative of the tracking error are defined as the system states, respectively; and a concept of the lumped disturbance is introduced and formed during a modelling process of the control-oriented model.

7. The apparatus for controlling an electronic throttle system of a vehicle engine according to claim 6, wherein the operation condition parameters comprise the desired value of the actual opening angle of the electronic throttle valve; a nominal value of an inertia of the electronic throttle valve; a viscous damping coefficient of the electronic throttle valve; a torque of the pair of nonlinear return springs; and the friction torque.

8. The apparatus for controlling an electronic throttle system of a vehicle engine according to claim 6, wherein the lumped disturbance comprising disturbances, uncertainties and unknown nonlinearities in the electronic throttle systems, wherein the disturbances comprise transmission friction, the pair of nonlinear return springs limp-home, gear backlash and external disturbances introduced by an intake air flow force, production deviations variations of external conditions and aging; the uncertainties comprise parameters uncertainties of the DC motor and the electronic throttle valve, wherein the uncertainties results from different running environments of a vehicle system itself, different elevation heights, weather conditions, humidity and atmospheric pressure changes, modelling errors of the friction torque and the torque of the pair of nonlinear return springs; and the unknown nonlinearities comprise transmission friction torque, the gear backlash, and the pair of nonlinear return springs torque, wherein the unknown nonlinearities bring about non-smooth characteristic nonlinearities and exert a significant influence on a performance of the electronic throttle system.

9. The apparatus for controlling an electronic throttle system of a vehicle engine according to claim 8, wherein the friction torque comprises friction characteristics depending on different materials, processing technologies and environmental circumstances, wherein the friction torque is nonlinear and difficult to model by direct theoretical analysis, the friction torque degrades the performance of the electronic throttle system, and thus the friction torque is considered as a system disturbance component and refrained effectively to improve an anti-disturbance capability of the electronic throttle system.

10. The apparatus for controlling an electronic throttle system of a vehicle engine according to claim 6, wherein the controller model comprises an output feedback control section, a feedforward control section and a finite-time control section.

11. The apparatus for controlling an electronic throttle system of a vehicle engine according to claim 10, wherein the output feedback control section comprises an output feedback control term; the tracking error between the actual opening angle and the desired value is defined as the system states, and control coefficients are determined based on the operation condition parameters and constant parameters associated with the control-oriented model.

12. The apparatus for controlling an electronic throttle system of a vehicle engine according to claim 10, wherein the feedforward control section comprises a feedforward control term based on the estimation values of the system states and the lumped disturbance provided by the observer model; control coefficients are determined based on the operation condition parameters and constant parameters associated with the control-oriented model and the observer model.

13. The apparatus for controlling an electronic throttle system of a vehicle engine according to claim 10, wherein the finite time control section comprises a finite-time control term combined with a sliding mode variable; control coefficients are determined based on the operation condition parameters and constant parameters associated with the control-oriented model and the observer model.

14. The apparatus for controlling an electronic throttle system of a vehicle engine according to claim 6, wherein the observer model is designed based on the operation condition parameters, the desired value of the system output, a control input and functions of the control-oriented model, wherein the observer model is configured to acquire the estimation values of the system states and the lumped disturbance in finite-time, and thus can significantly decrease the measurement cost and reduce the computation burden; in the absence of disturbance, the observer model is demonstrated to cause no adverse effects on the system, which guarantees a retention of a nominal control performance of the electronic throttle system.

* * * * *